US012330000B2

(12) United States Patent
Xing

(10) Patent No.: US 12,330,000 B2
(45) Date of Patent: Jun. 17, 2025

(54) FIRE PROTECTION DEVICE AND FIRE PROTECTION METHOD FOR EQUIPMENT ROOM

(71) Applicant: CHANGXIN MEMORY TECHNOLOGIES, INC., Anhui (CN)

(72) Inventor: Bangzhong Xing, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 736 days.

(21) Appl. No.: 17/572,775

(22) Filed: Jan. 11, 2022

(65) Prior Publication Data

US 2023/0034998 A1 Feb. 2, 2023

Related U.S. Application Data

(63) Continuation of application No. PCT/CN2021/117279, filed on Sep. 8, 2021.

(30) Foreign Application Priority Data

Jul. 28, 2021 (CN) ......................... 202110858091.2

(51) Int. Cl.
*A62C 3/00* (2006.01)
*A62C 3/16* (2006.01)
(Continued)

(52) U.S. Cl.
CPC ................ *A62C 3/002* (2013.01); *A62C 3/16* (2013.01); *A62C 35/023* (2013.01); *A62C 35/62* (2013.01);
(Continued)

(58) Field of Classification Search
CPC ......... A62C 3/002; A62C 3/16; A62C 35/023; A62C 35/62; A62C 37/40; A62C 37/50; A62C 5/02; A62C 99/0027
(Continued)

(56) References Cited

U.S. PATENT DOCUMENTS

2007/0044979 A1 3/2007 Popp
2012/0312566 A1* 12/2012 Henry .................... A62C 13/66 169/85
2014/0166319 A1 6/2014 Shaik et al.

FOREIGN PATENT DOCUMENTS

CN 103325207 A 9/2013
CN 103656922 A 3/2014
(Continued)

OTHER PUBLICATIONS

"Chemical Production and Environmental Protection", May 2016, Qi Lijun, University of Electronic Science and Technology of China, 6 pgs.

(Continued)

*Primary Examiner* — Christopher S Kim
(74) *Attorney, Agent, or Firm* — Kilpatrick Townsend & Stockton LLP

(57) ABSTRACT

A fire protection device and a fire protection method for an equipment room are provided. The fire protection device for the equipment room includes: a carbon dioxide fire extinguisher and a foam fire extinguisher; and a control module, in which the control module is configured to acquire fire information and person information, the person information representing a person situation in the equipment room, and the control module is further configured to control one of the carbon dioxide fire extinguisher or the foam fire extinguisher to extinguish fire according to the fire information and the person information, to extinguish the fire through the carbon dioxide fire extinguisher in a case that the equipment room is vacant.

12 Claims, 2 Drawing Sheets

(51) Int. Cl.

| | |
|---|---|
| ***A62C 35/02*** | (2006.01) |
| ***A62C 35/62*** | (2006.01) |
| ***A62C 37/40*** | (2006.01) |
| ***A62C 37/50*** | (2006.01) |
| *A62C 5/02* | (2006.01) |
| *A62C 99/00* | (2010.01) |

(52) U.S. Cl.
CPC .............. *A62C 37/40* (2013.01); *A62C 37/50* (2013.01); *A62C 5/02* (2013.01); *A62C 99/0027* (2013.01)

(58) Field of Classification Search
USPC .......................................... 169/56, 60, 61, 70
See application file for complete search history.

(56) References Cited

FOREIGN PATENT DOCUMENTS

| | | | |
|---|---|---|---|
| CN | 206304264 | U | 7/2017 |
| CN | 206660356 | U | 11/2017 |
| CN | 110652673 | A | 1/2020 |
| CN | 211097167 | U | 7/2020 |
| CN | 211874163 | U | 11/2020 |
| CN | 112237707 | A | 1/2021 |
| JP | 2015208640 | A | 11/2015 |

OTHER PUBLICATIONS

"Consumption Quota of Housing Repair Engineering", Dec. 2018, Chapter V Fire Control Engineering, Ministry and Housing and Urban Rural Development, PRC, 6 pgs.
First Office Action of the Chinese application No. 202110858091.2, issued on Dec. 24, 2021, 18 pgs.

* cited by examiner

FIRE PROTECTION DEVICE AND FIRE PROTECTION METHOD FOR EQUIPMENT ROOM

CROSS-REFERENCE TO RELATED APPLICATIONS

This is a continuation application of International Patent Application No. PCT/CN2021/117279, filed on Sep. 8, 2021, which claims priority to Chinese Patent Application No. 202110858091.2, filed on Jul. 28, 2021 and entitled "FIRE PROTECTION DEVICE AND FIRE PROTECTION METHOD FOR EQUIPMENT ROOM". The disclosures of International Patent Application No. PCT/CN2021/117279 and Chinese Patent Application No. 202110858091.2 are incorporated by reference herein in their entireties.

TECHNICAL FIELD

Embodiments of the disclosure relate to, but are not limited to, a fire protection device and a fire protection method for an equipment room.

BACKGROUND

Precision devices, such as computers and production machines, are usually placed in an equipment room, and usually operate for many important businesses. If a fire occurs in the equipment room, great damage will be caused, and all production activities will be stopped. Therefore, the environment safety of the equipment room is very important.

Usually, each equipment room will be equipped with a corresponding fire protection device. However, the current fire protection device for the equipment room is relatively backward, and it is difficult to provide comprehensive protection to the equipment and the persons in the equipment room.

SUMMARY

According to some embodiments of the disclosure, in one aspect, an embodiment of the disclosure provides a fire protection device for an equipment room. The fire protection device includes: at least one carbon dioxide fire extinguisher and at least one foam fire extinguisher; and a control module in which the control module is configured to acquire fire information and person information, the person information representing a person situation in the equipment room, and the control module is further configured to control one of the carbon dioxide fire extinguisher or the foam fire extinguisher to extinguish fire according to the fire information and the person information, to extinguish the fire through the carbon dioxide fire extinguisher in a case that the equipment room is vacant.

According to some embodiments of the disclosure, in another aspect, an embodiment of the disclosure further provides a fire protection method for an equipment room, which includes the following operations. A fire protection device for the equipment room is provided. A control module of the fire protection device is activated to acquire fire information and person information, and to control one of a carbon dioxide fire extinguisher or a foam fire extinguisher to extinguish fire according to the fire information and the person information, so as to extinguish the fire through the carbon dioxide fire extinguisher in a case that the equipment room is vacant.

BRIEF DESCRIPTION OF THE DRAWINGS

One or more embodiments are exemplarily explained through the figures in the accompanying drawings corresponding thereto, these exemplary explanations do not constitute a limitation to the embodiments. Unless otherwise specifically declared, the figures in the accompanying drawings do not constitute a limitation of proportion.

DETAILED DESCRIPTION

As can be known from the Background, the current fire protection device for the equipment room is relatively backward, and it is difficult to provide the comprehensive protection for the equipment and the persons in the equipment room. After analysis, it is found that the main reason is that carbon dioxide gas can reduce the secondary damage to the equipment to the greatest extent, and therefore the carbon dioxide fire extinguisher is mostly adopted as the current fire protection device in the equipment room. However, the carbon dioxide fire extinguisher has a slower extinguishing speed, and is prone to cause frostbite and suffocation to the human body, which easily causes injuries to the persons. When a single type of carbon dioxide fire extinguisher is adopted, it is difficult to ensure the safety of the persons and the equipment simultaneously. In addition, if a single type of carbon dioxide fire extinguishing system fails, greater losses may be caused. In addition, currently, independent fire extinguishing facilities are usually adopted, and the automation of the fire protection device is relatively low, so that the fire cannot be effectively detected and controlled.

An embodiment of the disclosure provides a fire protection device for an equipment room, in which a control module is configured to acquire fire information and person information, and select one of carbon dioxide fire extinguisher or foam fire extinguisher to extinguish fire based on the fire information and the person information. In this way, the fire extinguishing characteristics of the carbon dioxide fire extinguisher or the foam fire extinguisher can be fully utilized, so that the fire can be automatically and effectively detected and controlled, thereby enhancing the protection for the persons and the equipment.

In order to make the objectives, technical solutions and advantages of the embodiments of the disclosure more apparent, the respective embodiments of the disclosure will be described in detail in connection with the accompanying drawings. However, those ordinary skilled in the art may understand that, in the respective embodiments of the disclosure, numerous technical details are set forth in order to provide a reader with a better understanding of the disclosure. However, the technical solutions claimed in the present disclosure can also be implemented without these technical details and various changes and modifications based on the respective embodiments below.

Figure 1:
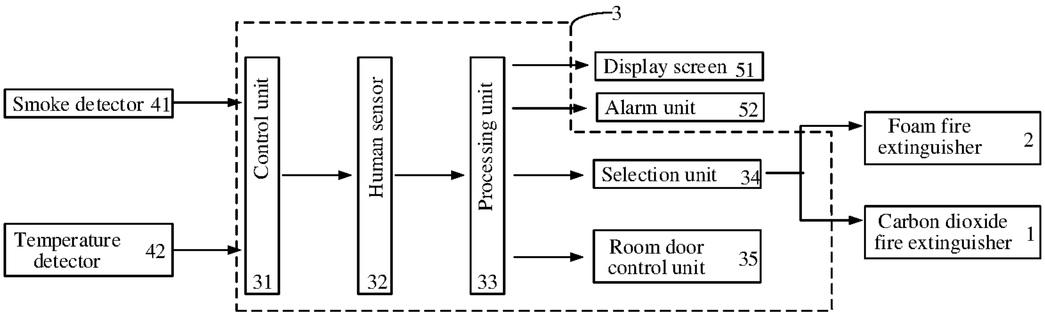
FIG. 1 is a functional block diagram of a fire protection device for an equipment room according to an embodiment of the disclosure.
Figure 2:
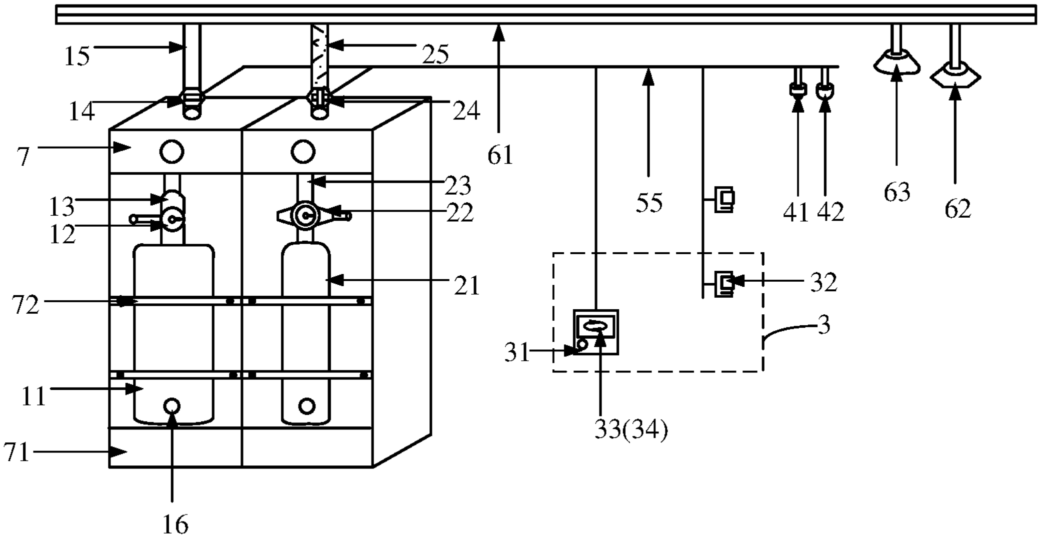
FIG. 2 is a schematic diagram of a fire protection device for an equipment room according to an embodiment of the disclosure.
Figure 3:
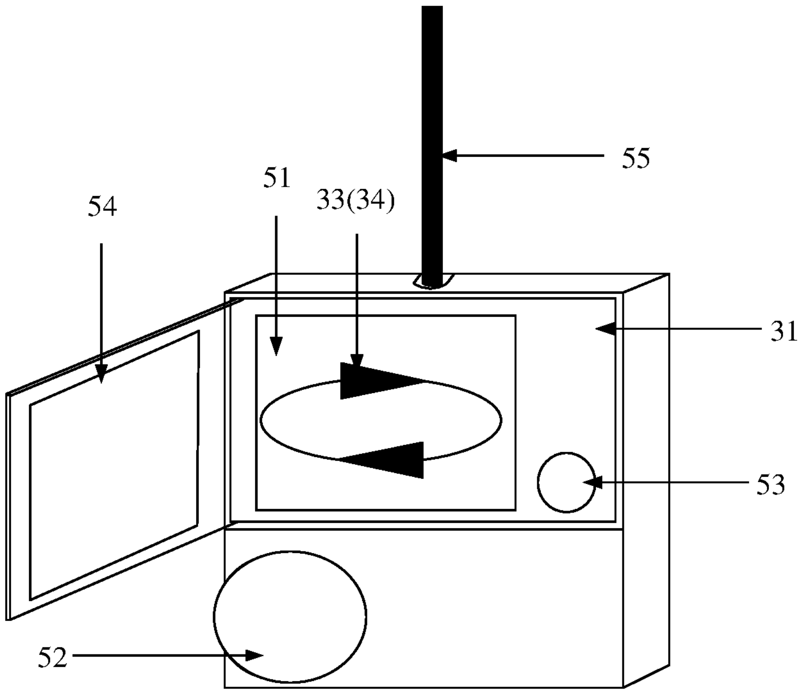
FIG. 3 is a partial schematic diagram of a structure shown in FIG. 2.

An embodiment of the disclosure provides a fire protection device for an equipment room. Referring to FIG. 1 to FIG. 3, the fire protection device for the equipment room includes a carbon dioxide fire extinguisher 1 and a foam fire extinguisher 2; and a control module 3. The control module 3 is configured to acquire fire information and person information, and the person information represents a person situation in the equipment room. The control module 3 is further configured to control one of the carbon dioxide fire extinguisher 1 or the foam fire extinguisher 2 to extinguish fire according to the fire information and the person information, so as to extinguish the fire through the carbon dioxide fire extinguisher 1 in a case that the equipment room is vacant, that is, there is no person in the equipment room.

The fire protection device for the equipment room will be described in detail below.

In some embodiments, the equipment room may be a computer room, which generally refers to a room designed for continuous operation of computer servers. The computer room may be provided with multiple cabinets for storing equipment such as minicomputers, storage devices, servers and other equipment. According to other embodiments, the equipment room may also be a production workshop, which is provided with multiple production machines.

Referring to FIG. 1 and FIG. 2, the carbon dioxide fire extinguisher 1 includes a carbon dioxide storage bottle 11; a gas pressure gauge 12 mounted on a top end of the carbon dioxide storage bottle 11; a gas safety valve 13 mounted on a top end of the gas pressure gauge 12; a gas drive device 14 mounted on a top end of the gas safety valve 13; and a high-pressure hose 15 mounted on a top end of the gas drive device 14. The carbon dioxide storage bottle 11 is configured to store carbon dioxide gas. The gas pressure gauge 12 is configured to display the pressure in the carbon dioxide storage bottle 11. The gas safety valve 13 is configured to provide protection against leakage of the carbon dioxide gas. The gas drive device 14 is configured to control the carbon dioxide gas to be ejected. The high-pressure hose 15 is configured to collect the carbon dioxide gas while buffering pressure and reducing vibration, and may further reduce the risk of electric shock when the equipment is performed fire extinguishing. A feed inlet 16 is further fixedly mounted at the bottom end of the carbon dioxide storage bottle 11.

The extinguishing mechanism of the carbon dioxide fire extinguisher 1 is suffocation, so that the fire may be extinguished by reducing the oxygen concentration of the air surrounding the burning objects. The carbon dioxide fire extinguisher has good insulation, and does not cause corrosion and damage to the equipment. Therefore, the carbon dioxide fire extinguisher 1 is used to extinguish the fire in a case that there is no person in the equipment room, which can prevent the equipment from being damaged to the greatest extent.

The foam fire extinguisher 2 includes: a foam storage bottle 21; a foam pressure gauge 22 mounted on a top end of the foam storage bottle 21; a foam safety valve 23 mounted on a top end of the foam pressure gauge 22; a foam drive device 24 mounted on a top end of the foam safety valve 23; and a metal hose 25 mounted on a top end of the foam drive device 24. The foam storage bottle 21 is configured to store a foam extinguishing agent. The foam pressure gauge 22 is configured to display the pressure in the foam storage bottle 21. The foam safety valve 23 is configured to provide protection against leakage of the foam extinguishing agent. The foam drive device 24 is configured to control the foam extinguishing agent to be ejected. The metal hose 25 is configured to collect the foam extinguishing agent, while buffering pressure and reducing vibration.

The foam fire extinguisher 2 may eject a large amount of foam, which can be adhered to combustible materials to isolate the combustible materials from the air, while reducing the temperature and destroying the combustion conditions, thereby achieving the purpose of extinguishing the fire. The foam fire extinguisher 2 has a higher extinguishing speed, and can directly eject the foam to the human body.

Referring to FIG. 1 and FIG. 2, the control module 3 is configured to acquire the fire information and the person information, and to select the matched carbon dioxide fire extinguisher 1 or the foam fire extinguisher 2 to extinguish the fire according to the specific fire information and person information, thereby enhancing the protection for the persons and the equipment. The control module 3 will be described in detail below.

The control module 3 includes a control unit 31, a human sensor 32, a processing unit 33 and a selection unit 34.

The control unit 31 is configured to acquire the fire information. In some embodiments, the fire information includes smoke data and temperature data.

Accordingly, the fire protection device further includes a smoke detector 41 and a temperature detector 42. The smoke detector 41 is configured to detect smoke in the equipment room to generate the smoke data and transmit the smoke data to the control module 3. The temperature detector 42 is configured to detect a temperature in the equipment room to generate the temperature data and transmit the temperature data to the control module 3. The smoke detector 41 and the temperature detector 42 may be connected to the control module 3 through a data wire 55. That is, the smoke detector 41 and the temperature detector 42 may detect the fire information in time and transmit the fire information to the control unit 31 in the control module 3.

In some embodiments, the smoke detector 41 may be configured to determine whether the smoke concentration in the equipment room exceeds a first concentration threshold. In a case that the smoke concentration in the equipment room exceeds the first concentration threshold, the smoke detector 41 transmits the smoke data to the control module 3. In a case that the smoke concentration in the equipment room does not exceed the first concentration threshold, the smoke data does not need to be transmitted to the control module 3. The temperature detector 42 may be configured to determine whether the temperature in the equipment room exceeds a first temperature threshold. In a case that the temperature in the equipment room exceeds the first temperature threshold, the temperature detector 42 transmits the temperature data to the control module 3. In a case that the temperature in the equipment room does not exceed the first temperature threshold, the temperature data does not needed to be transmitted to the control module 3. It should be understood that in a case that the control module 3 receives the smoke data or the temperature data, it is indicated that a fire may occur in the equipment room.

In other embodiments, the smoke detector 41 and the temperature detector 42 may transmit the smoke data and the temperature data to the control module 3 in real time. The control module 3 performs real-time analysis on the smoke data and the temperature data to determine whether a fire occurs, the severity of the fire, and the change of the fire.

The human sensor 32 is configured to detect the person information. The human sensor 32 may be a thermal infrared human sensor configured to detect infrared rays emitted by the human bodies. The human sensor 32 may be connected to the control unit 31 through the data wire 55. In some embodiments, the human sensor 32 may detect whether there is a person in the equipment room in real time, that is, the human sensor 32 is always running. In other embodiments, the human sensor 32 may further be triggered by the control unit 31. The human sensor 32 is triggered to detect the person information in responsive to that the fire information is acquired by the control unit 31. In this way, the data processing process can be simplified, and the energy consumption can be reduced.

The processing unit 33 is configured to receive the fire information and the person information, and to generate a first selection signal or a second selection signal. That is, the processing unit 33 is configured to analyze the fire information and the person information, and automatically determine and select the fire extinguishing method according to the analysis results. The first selection signal corresponds to the actuation of the carbon dioxide fire extinguisher 1, while the second selection signal corresponds to the actuation of the foam fire extinguisher 2. The processing unit 33 is further connected to a gas drive device 14 and a foam drive device 24 through the data wire 55.

In some embodiments, the processing unit 33 is configured to generate the first selection signal in a case that the fire information is received and the person information represents that the equipment room is vacant, that is, there is no person in the equipment room; or to generate the second selection signal in a case that the fire information is received and the person information represents that there is a person in the equipment room. That is, in a case that a fire occurs and there is no person in the equipment room, the carbon dioxide fire extinguisher 1 is selected to be actuated by the processing unit 33; or in a case that a fire occurs and there is a person in the equipment room, the foam fire extinguisher 2 is selected to be actuated by the processing unit 33. In this way, on the premise of ensuring the safety of the persons, the fire can be controlled and the equipment can be protected to the greatest extent, so as to reduce the loss of person and property.

In other embodiments, the processing unit 33 is configured to determine whether the duration of receiving the fire information is less than a preset threshold. In a case that the duration of receiving the fire information is less than the preset threshold, the first selection signal is generated. In a case that the duration of receiving the fire information is not less than the preset threshold and the person information represents that there is no person in the equipment room, the first selection signal is generated. In a case that the duration of receiving the fire information is not less than the preset threshold and the person information represents that there is a person in the equipment room, the second selection signal is generated. That is, the control unit 31 may acquire the fire information for multiple times, and the processing unit 33 may acquire the difference between the time point at which the fire information is received for the first time and the time point at which the fire information is subsequently received, and then determine whether the duration of the fire is less than the preset threshold. In a case that the duration of receiving the fire information is less than the preset threshold, it is indicated that the fire is in the initial stage and the fire may be not serious. In this case, it is sufficient to use the carbon dioxide fire extinguisher 1 to control the fire. In a case that the duration of receiving the fire information is larger than or equal to the preset threshold, it is indicated that the fire lasts for a long time. In this case, if the person information represents that there is a person in the equipment room, it means that the person has not escaped in time, and the fire may be relatively serious. Thus, it is necessary to use the foam fire extinguisher 2 to strengthen the fire extinguishing intensity, thereby increasing the fire extinguishing speed. In a case that there is no person in the equipment room, in order to reduce the damage to the equipment, it is necessary to use the carbon dioxide fire extinguisher 1 to extinguish the fire.

In still other embodiments, the processing unit 33 may further be configured to determine the severity of the fire and the change of the fire in real time, and to generate the first selection signal in a case that the severity of the fire is relatively low and the fire is obviously controlled, or to generate the second selection signal in a case that the severity of the fire is relatively high or the severity of the fire is increasing.

The selection unit 34 is configured to receive the first selection signal to actuate the carbon dioxide fire extinguisher 1 to extinguish the fire, or to receive the second selection signal to actuate the foam fire extinguisher 2 to extinguish the fire. That is, the selection unit 34 is configured to execute the first selection signal or the second selection signal. In this way, the automation of fire extinguishing can be improved, and casualties can be reduced.

The control module 3 may further include: a room door control unit 35. The door room control unit is configured to close a room door of the equipment room in a case that the fire information is received and the person information represents that there is no person in the equipment room, or to open the room door of the equipment room in a case that the fire information is received and the person information represents that there is a person in the equipment room. The room door control unit 35 is further connected to the processing unit 33, and is configured to open or close the room door according to the processing signals transmitted by the processing unit 33. In this way, an escape route can be provided for the persons in time, and the fire source can be isolated from the external environment after all of the persons escape, so as to prevent the spread of smoke and the escape of flames, thereby earning time for the arrival of fire vehicles.

The fire protection device for the equipment room further includes a display screen 51. The display screen 51 is configured to display the fire information and the person information acquired by the control module 3. Specifically, the display screen 51 is connected to the processing unit 33, and is configured to display the fire information and the person information transmitted by the processing unit 33. In this way, it is beneficial to observe the fire situation and person escape situation in the equipment room. More specifically, referring to FIG. 2 and FIG. 3, the display screen 51 and a start key 53 are fixedly mounted on the control unit 31. The start key 53 is configured to actuate the display screen 51. A transparent window 54 is further fixedly mounted on the surface of the display screen 51.

Referring to FIG. 1 and FIG. 3, the fire protection device further includes an alarm unit 52. The processing unit 33 is connected to the alarm unit 52. In a case that the fire information is received by the processing unit 33, the alarm unit 52 will automatically give an alarm to issue an alarming sound or light, so as to remind the persons to pay attention to their safety.

Continuing to refer to FIG. 1 and FIG. 2, in some embodiments, the equipment room may include person gathering areas, equipment areas and a plurality of fire fighting units. Each fire fighting unit is equipped with a plurality of carbon dioxide fire extinguishers 1 and a plurality of foam fire extinguishers 2, and each fire fighting unit corresponds to a respective one of the person gathering areas or a respective one of the equipment areas. The fire protection device further includes a conveying pipeline 61. The conveying pipeline 61 is configured to convey a fire extinguishing medium released in each fire fighting unit to the respective one of the person gathering areas or the respective one of the equipment areas. One end of the conveying pipeline 61 is connected to the high-pressure hose 15 of the carbon dioxide fire extinguisher 1 and the metal hose 25 of the foam fire extinguisher 2, and the other end of the conveying pipeline 61 is further provided with a foam nozzle 62 and a gas nozzle 63. The conveying pipeline 61 may convey the fire extinguishing medium to the foam nozzle 62 and the gas nozzle 63, so as to perform fire extinguishing operation for the equipment room.

In each fire fighting unit corresponding to the respective one of the person gathering areas, the number of the foam fire extinguishers 2 is larger than the number of the carbon dioxide fire extinguishers 1. In each fire fighting unit corresponding to the respective one of the equipment areas, the number of the carbon dioxide fire extinguishers 1 is larger than the number of the foam fire extinguishers 2. That is, different numbers of the foam fire extinguishers 2 and the carbon dioxide fire extinguishers 1 are set according to the conditions of persons and equipment in different areas, so that the characteristics of the two types of fire extinguishers can be fully utilized to ensure the safety of the persons and the equipment as much as possible.

The fire protection device further includes a fire protection cabinet 7. The fire protection cabinet 7 is configured to store and protect the carbon dioxide fire extinguishers 1 and the foam fire extinguishers 2 in each fire fighting unit. A base 71 is fixedly mounted at the bottom end of the fire protection cabinet 7. The fire protection device further includes a fixing component 72. The fixing component 72 is configured to fix the carbon dioxide fire extinguishers 1 and the foam fire extinguishers 2 in each fire protection cabinet 7. In this way, the carbon dioxide storage bottle 11 and the foam storage bottle 21 can be protected, thereby prolonging the service life of the fire extinguishers. Further, it is beneficial for the placement and replacement of the carbon dioxide storage bottle 11 and the foam storage bottle 21.

Overall, the control module 3 can select one of the carbon dioxide fire extinguisher 1 or the foam fire extinguisher 2 to extinguish the fire based on the fire information and the person information, so that the automation of fire extinguishing can be improved, and the protection for the equipment and the persons can be enhanced.

Another embodiment of the disclosure provides a fire protection method for an equipment room. The fire protection method can be implemented by the fire protection device for the equipment room provided by the above embodiments. The description of same or similar parts between this embodiment and the above embodiments may by refer to the description of the foregoing embodiments, which will not be repeated herein.

Referring to FIG. 1, the control module 3 is actuated. The control module 3 is configured to acquire the fire information and the person information, and to control one of the carbon dioxide fire extinguisher 1 or the foam fire extinguisher 2 to extinguish the fire according to the fire information and the person information, so as to extinguish the fire through the carbon dioxide fire extinguisher 1 in a case that there is no person in the equipment room.

The fire protection process will be described in detail below.

Referring to FIG. 1 and FIG. 2, the smoke detector 41 and the temperature detector 42 are actuated. The fire information is detected by the smoke detector 41 and the temperature detector 42 and transmitted to the control unit 31. The human sensor 32 is actively triggered to acquire the person information responsive to that the fire information is received by the control unit 31. The fire information and the person information are received by the processing unit 33, and the fire extinguishing method is automatically determined and selected by the processing unit.

In some embodiments, in a case that the fire information is detected by the smoke detector 41 and the temperature detector 42 and the person information detected by the human sensor 32 represents that there is no person in the equipment room, the fire extinguishing method will be performed according to the following sequence. Warning information is sent out by the alarm unit 52, the carbon dioxide fire extinguisher 1 is selected by the selection unit 34 to extinguish the fire according to the first selection signal, and the room door is closed by the room door control unit 35. In a case that the fire information is detected by the smoke detector 41 and the temperature detector 42 and the person information detected by the human sensor 32 represents that there is a person in the equipment room, the fire extinguishing method will be performed according to the following sequence. Warning information is sent out by the alarm unit 52, the foam fire extinguisher 2 is selected by the selection unit 34 to extinguish the fire according to the second selection signal, and the room door is opened by the room door control unit 35.

In other embodiments, the processing unit 33 is further configured to determine whether the duration of receiving the fire information is less than a preset threshold. In a case that the duration of receiving the fire information is less than the preset threshold, the first selection signal is generated. In a case that the duration of receiving the fire information is not less than the preset threshold and the person information represents that there is no person in the equipment room, the first selection signal is generated. In a case that the duration of receiving the fire information is not less than the preset threshold and the person information represents that there is a person in the equipment room, the second selection signal is generated. In other words, in a case that the duration of receiving the fire information is less than the preset threshold, i.e., the fire is in the initial stage, the carbon dioxide fire extinguisher 1 is used to extinguish the fire. In a case that the duration of receiving the fire information is larger than or equal to the preset threshold, i.e., after the fire lasts for a period of time, and the person information represents that there is a person in the equipment room, the foam fire extinguisher 2 is actuated to enhance the fire extinguishing intensity. In this case, if there is no person in the equipment room, in order to reduce the damage to the equipment, it is necessary to use the carbon dioxide fire extinguisher 1 to extinguish the fire.

Overall, based on the specific fire information and person information, the control module 3 selects the corresponding carbon dioxide fire extinguisher 1 or foam fire extinguisher 2 to extinguish the fire, so that the appropriate fire extinguishing methods may be selected for the fire with different severity, thereby enhancing the protection for the equipment and persons.

In practical applications, the control module 3 can all be implemented by a Central Processing Unit (CPU), a Digital Signal Processor (DSP), a Field-Programmable Gate Array (FPGA) in the portal client or any suitable analog or digital circuit.

Those of ordinary skill in the art may understand that the above embodiments are specific embodiments to implement the disclosure. In practical applications, various changes may be made in form and details without departing from the spirit and scope of the disclosure. Any person skilled in the art may make changes and modifications without departing from the spirit and scope of the disclosure. Therefore, the protection scope of the disclosure should be subjected to the scope defined by the appended claims.

The invention claimed is:

1. A fire protection device for an equipment room, comprising:
at least one carbon dioxide fire extinguisher and at least one foam fire extinguisher, wherein the at least one carbon dioxide fire extinguisher includes a gas drive device configured to control carbon dioxide gas to be ejected, and the at least one foam fire extinguisher includes a foam drive device configured to control foam extinguishing agent to be ejected;
a controller, wherein the controller comprises:
a first sub-controller configured to acquire fire information;
a human sensor configured to detect person information, the person information representing a person situation in the equipment room;
a processor configured to receive the fire information and the person information and generate a first selection signal or a second selection signal;
a selection circuit configured to receive the first selection signal to actuate the at least one carbon dioxide fire extinguisher to extinguish a fire, or receive the second selection signal to actuate the at least one foam fire extinguisher to extinguish the fire; and
a second sub-controller, wherein the second sub-controller is configured to close a room door of the equipment room in a first case that the fire information is received and the person information represents that the equipment room is vacant, or to open the room door of the equipment room in a second case that the fire information is received and the person information represents that there is a person in the equipment room.

2. The fire protection device for the equipment room of claim 1, wherein
the first sub-controller is further configured to trigger the human sensor to detect the person information responsive to acquiring the fire information.

3. The fire protection device for the equipment room of claim 1, wherein
the processor is configured to:
generate the first selection signal, in a case that the fire information is received and the person information represents that the equipment room is vacant; or
generate the second selection signal, in a case that the fire information is received and the person information represents that there is a person in the equipment room.

4. The fire protection device for the equipment room of claim 1, wherein
the processor is configured to:
determine whether a duration of receiving the fire information is less than a preset threshold,
generate the first selection signal, in a case that the duration of receiving the fire information is less than the preset threshold;
generate the first selection signal, in a case that the duration of receiving the fire information is not less than the preset threshold and the person information represents that the equipment room is vacant; or
generate the second selection signal, in a case that the duration of receiving the fire information is not less than the preset threshold and the person information represents that there is a person in the equipment room.

5. The fire protection device for the equipment room of claim 1, wherein
the fire information comprises smoke data and temperature data, and the fire protection device further comprises:
a smoke detector configured to detect smoke in the equipment room to generate the smoke data and transmit the smoke data to the controller; and
a temperature detector configured to detect a temperature in the equipment room to generate the temperature data and transmit the temperature data to the controller.

6. The fire protection device for the equipment room of claim 1, further comprising
a display screen configured to display the fire information and the person information acquired by the controller.

7. The fire protection device for the equipment room of claim 1, wherein
the equipment room comprises person gathering areas, equipment areas and fire fighting devices, each fire fighting device is equipped with a plurality of carbon dioxide fire extinguishers and a plurality of foam fire extinguishers, and each fire fighting device corresponds to a respective one of the person gathering areas or a respective one of the equipment areas; and
wherein the fire protection device further comprises a conveying pipeline configured to convey a fire extinguishing medium released in each fire fighting device to the respective one of the person gathering areas or the respective one of the equipment areas.

8. The fire protection device for the equipment room of claim 7, wherein
in each fire fighting device corresponding to the respective one of the person gathering areas, the number of the foam fire extinguishers is larger than the number of the carbon dioxide fire extinguishers;
and in each fire fighting device corresponding to the respective one of the equipment areas, the number of the carbon dioxide fire extinguishers is larger than the number of the foam fire extinguishers.

9. The fire protection device for the equipment room of claim 7, further comprising
a fire protection cabinet configured to store and protect the carbon dioxide fire extinguishers and the foam fire extinguishers in each fire fighting device.

10. The fire protection device for the equipment room of claim 9, further comprising
a fixing component configured to fix the carbon dioxide fire extinguishers and the foam fire extinguishers in the fire protection cabinet.

11. The fire protection device for the equipment room of claim 1, wherein
each carbon dioxide fire extinguisher further comprises: a carbon dioxide storage bottle; a gas pressure gauge mounted on a top end of the carbon dioxide storage bottle; a gas safety valve mounted on a top end of the gas pressure gauge; and a high-pressure hose mounted on a top end of the gas drive device, wherein the gas drive device is mounted on a top end of the gas safety valve.

12. The fire protection device for the equipment room of claim 1, wherein
each foam fire extinguisher comprises: a foam storage bottle; a foam pressure gauge mounted on a top end of the foam storage bottle; a foam safety valve mounted on a top end of the foam pressure gauge; and a metal hose mounted on a top end of the foam drive device, wherein the foam drive device is mounted on a top end of the foam safety valve.

* * * * *